(12) United States Patent
Hinton et al.

(10) Patent No.: US 9,800,614 B2
(45) Date of Patent: Oct. 24, 2017

(54) METHOD AND SYSTEM FOR GLOBAL LOGOFF FROM A WEB-BASED POINT OF CONTACT SERVER

(75) Inventors: Heather Maria Hinton, Austin, TX (US); Anthony Scott Moran, Fort Lauderdale, FL (US); Benjamin Brewer Harmon, Santa Cruz, CA (US)

(73) Assignee: International Business Machines Corporation, Armonk, NY (US)

( * ) Notice: Subject to any disclaimer, the term of this patent is extended or adjusted under 35 U.S.C. 154(b) by 1323 days.

(21) Appl. No.: 11/752,576

(22) Filed: May 23, 2007

(65) Prior Publication Data
US 2008/0294781 A1    Nov. 27, 2008

(51) Int. Cl.
*G06F 15/173* (2006.01)
*H04L 29/06* (2006.01)
(Continued)

(52) U.S. Cl.
CPC .......... *H04L 63/20* (2013.01); *G06F 17/3048* (2013.01); *G06F 17/30371* (2013.01);
(Continued)

(58) Field of Classification Search
CPC .............. H04L 63/0807; H04L 9/3213; G06F 17/30371; G06F 17/3048; G06F 17/30575
(Continued)

(56) References Cited

U.S. PATENT DOCUMENTS 6,421,768 B1 *   7/2002  Purpura ..................... 711/164
6,496,824 B1 *  12/2002  Wilf .......................... 707/688
(Continued)

*Primary Examiner* — Kyung H Shin
(74) *Attorney, Agent, or Firm* — Jeffrey S. LaBaw; David H. Judson

(57) ABSTRACT

A method carried out at a point of contact (e.g., reverse proxy, a web server plug-in, or the like) that serves as an intermediary between a client browser and one or more back-end applications (or application component), wherein each back-end application has the capability to set its own server-side session management data with respect to the point of contact that is independent of any client-side session management data set by the point of contact and used by the point of contact to manage a user session. The method begins as a given back-end application returns a response to a first request that has been issued from the client browser (the first request having been received at the point of contact and passed to a back end application or component for processing). The point of contact intercepts the out-going response, augments server-side session management data associated therewith with a "stamp," and forwards to the client browser the response together with the server-side session management data as augmented to include the stamp. The stamp provides a way for the point of contact to later determine whether the server-side session management data, if received with another user request, is valid for that request. Later, upon receipt at the point of contact of a new user request that includes the server-side session management data (and stamp), the point of contact uses the stamp to determine whether the new request is valid. If so, the point of contact removes the stamp from the server-side session management data and forwards the new request (and the management data) to the back-end application for handling.

22 Claims, 7 Drawing Sheets

(51) Int. Cl.
*H04L 9/32* (2006.01)
*G06F 17/30* (2006.01)

(52) U.S. Cl.
CPC ...... *G06F 17/30575* (2013.01); *H04L 9/3213* (2013.01); *H04L 63/0807* (2013.01); *H04L 63/08* (2013.01)

(58) Field of Classification Search
USPC .......................................................... 726/5
See application file for complete search history.

(56) References Cited

U.S. PATENT DOCUMENTS

| | | | | |
|---|---|---|---|---|
| 6,587,836 | B1* | 7/2003 | Ahlberg et al. | 705/26 |
| 6,956,845 | B2* | 10/2005 | Baker et al. | 370/352 |
| 6,993,596 | B2* | 1/2006 | Hinton et al. | 709/250 |
| 7,082,532 | B1* | 7/2006 | Vick et al. | 713/155 |
| 7,089,247 | B2* | 8/2006 | Kloos et al. | |
| 7,137,006 | B1* | 11/2006 | Grandcolas et al. | 713/180 |
| 7,421,733 | B2* | 9/2008 | Glassman et al. | 726/6 |
| 7,454,622 | B2* | 11/2008 | Laidlaw et al. | 713/182 |
| 7,464,402 | B2* | 12/2008 | Briscoe et al. | 726/5 |
| 7,472,171 | B2* | 12/2008 | Miller et al. | 709/219 |
| 7,475,136 | B2* | 1/2009 | Sinn | 709/224 |
| 7,475,146 | B2* | 1/2009 | Bazot et al. | 709/227 |
| 7,475,151 | B2* | 1/2009 | Delany et al. | 709/229 |
| 7,480,934 | B2* | 1/2009 | Chan et al. | 726/8 |
| 7,500,262 | B1* | 3/2009 | Sanin et al. | 726/2 |
| 7,503,061 | B2* | 3/2009 | Foster et al. | 726/2 |
| 7,536,433 | B2* | 5/2009 | Reilly | 709/202 |
| 7,694,335 | B1* | 4/2010 | Turner et al. | 726/14 |
| 7,730,523 | B1* | 6/2010 | Masurkar | 726/4 |
| 7,779,103 | B1* | 8/2010 | Fikes et al. | 709/223 |
| 2002/0007409 | A1 | 1/2002 | Rode | |
| 2002/0032731 | A1 | 3/2002 | Qian et al. | |
| 2002/0065912 | A1* | 5/2002 | Catchpole et al. | 709/224 |
| 2002/0073047 | A1 | 6/2002 | Morrison | |
| 2003/0065919 | A1* | 4/2003 | Albert et al. | 713/168 |
| 2003/0149900 | A1* | 8/2003 | Glassman et al. | 713/202 |
| 2003/0177187 | A1* | 9/2003 | Levine et al. | 709/205 |
| 2003/0177196 | A1* | 9/2003 | Bhasin et al. | 709/213 |
| 2004/0073565 | A1* | 4/2004 | Kaufman et al. | 707/101 |
| 2004/0107282 | A1 | 6/2004 | Chakraborty et al. | |
| 2004/0148366 | A1 | 7/2004 | Ross et al. | |
| 2005/0086298 | A1* | 4/2005 | Campbell et al. | 709/203 |
| 2005/0193093 | A1* | 9/2005 | Mathew et al. | 709/219 |
| 2005/0227218 | A1* | 10/2005 | Mehta et al. | 434/350 |
| 2005/0262026 | A1* | 11/2005 | Watkins | 705/67 |
| 2006/0098583 | A1* | 5/2006 | Baker et al. | 370/252 |
| 2006/0168645 | A1* | 7/2006 | Song et al. | 726/3 |
| 2006/0271671 | A1* | 11/2006 | Hansen | 709/224 |
| 2006/0277596 | A1* | 12/2006 | Calvert et al. | 726/3 |
| 2007/0101418 | A1* | 5/2007 | Wood et al. | 726/8 |
| 2007/0106670 | A1* | 5/2007 | Yoakum et al. | 707/10 |
| 2007/0150568 | A1* | 6/2007 | Ruiz | 709/223 |
| 2007/0150602 | A1* | 6/2007 | Yared et al. | 709/227 |
| 2007/0157304 | A1* | 7/2007 | Logan et al. | 726/12 |
| 2007/0180099 | A1* | 8/2007 | Tsimelzon et al. | 709/223 |
| 2007/0244964 | A1* | 10/2007 | Challenger et al. | 709/203 |
| 2007/0288634 | A1* | 12/2007 | Nakatsuyama | 709/225 |
| 2008/0021997 | A1* | 1/2008 | Hinton | 709/225 |
| 2008/0046462 | A1* | 2/2008 | Kaufman et al. | 707/102 |
| 2008/0066020 | A1* | 3/2008 | Boss et al. | 715/968 |
| 2008/0275980 | A1* | 11/2008 | Hansen | 709/224 |
| 2008/0294781 | A1* | 11/2008 | Hinton et al. | 709/227 |
| 2009/0077233 | A1* | 3/2009 | Kurebayashi et al. | 709/224 |
| 2009/0106433 | A1* | 4/2009 | Knouse et al. | 709/229 |
| 2009/0150985 | A1* | 6/2009 | Chan et al. | 726/8 |

* cited by examiner

METHOD AND SYSTEM FOR GLOBAL LOGOFF FROM A WEB-BASED POINT OF CONTACT SERVER

BACKGROUND OF THE INVENTION

Technical Field

The present invention relates generally to session management in an enterprise computing environment in which users access back-end resources through a front end point of contact, such as a reverse proxy or web server plug-in.

Background of the Related Art

Web portals centralize access to information, applications, and services for employees, customers, or partners. They deliver a consolidated view that lets users access the most important electronic resources of the organization using a standard technology (a web browser), simply and efficiently. Within a Web portal or like environment, typically a proxy or web server acts as a front-end "point of contact" to a set of back-end applications or application components. In this type of environment, the ideal scenario is that the mechanism used to provide authentication and session management at the web portal layer should also provide these functions for any back-end applications that are included in a consolidated view. However, as existing applications (each with its own authentication/session management) are moved into this environment, it is often not possible to turn off such authentication/session management functionality.

In this type of environment, approaches to session management typically have each back end application or application component requiring its own session state management, and each such application or component may implement its own session management technique. Where an end user is accessing multiple applications within a single enterprise, his or her browser ends up managing independent session management items (often as many as a different item per application). Typically, in this environment, these items are HTTP cookies, as the behavior of such cookies (although not intended for session management) provides reasonable session management. In particular, these cookies typically contain information (such as a JESSIONID value) that is managed by the application that sets it. Given this operating environment, consider the scenario where there are several applications, each managing their own JSESSIONID cookies. If a user ends his or her session at one application, this action typically will have no effect on the browser's session(s) with other applications. While this may represent desired behavior, this independence of session management techniques has undesired consequences when a special session management component is placed in front of these applications.

In particular, it is known in the prior art to enhance security of a Web portal by integrating an enterprise security product with the portal. Security refers to the portal's ability to authenticate users and authorize access to the Web resources. The quality of security services provided by an enterprise portal typically rests in the degree of integration between the portal service and an associated enterprise security product. One such enterprise-level security product, known as Tivoli® Access Manager (TAM), from IBM®, provides a single point-of-user authentication and authorization administration, together with Web-based single sign-on. This type of access manager provides authentication and authorization to Web-based resources, and it provides standards-based APIs that allow back-end Web application servers to access the access manager's security services.

Now, consider an environment using a product such as Tivoli Access Manager to provide authentication, session management and authorization functionality. As noted above, TAM provides a reverse proxy and/or web plug-in that provides session management functionality and that includes authorization functionality as part of this session management. Authentication is handled by TAM, meaning that TAM collects a user's authentication credentials, evaluates them, and establishes a session, including some form of session management functionality (such as a session cookie). To provide a user with the advantages of this consolidated environment, TAM then provides a single sign-on solution for the user by asserting authentication credentials (such as username/password) to the back-end applications. This allows the back-end application to be added to the portal environment without modification; in other words, because it is still able to execute the authentication process, changes to the application (e.g., to remove or turn-off this functionality) are not required. The side effect of this approach, however, is that the application will continue to employ its existing session management techniques. As noted above, however, the application may have its own session management techniques, including JSESSIONID cookies. Thus, while this environment may provide the user with a single point of authentication and may act as the "authoritative" session management authority, the back-end applications will often have their own, additional session management techniques that are used at runtime. The authorization session management source (e.g., TAM) is able to create a session, but it is not able to provide further session management at the granularity of the back-end applications, where duplicate session management is provided. Thus, for example, when a user logs out of TAM, the access manager has no way of indicating this log off to the back end applications, nor of "killing" these JESSIONID cookies so that further access to back end applications is possible.

This has several undesirable consequences. Consider a user, Alice, who logs into TAM and accesses a back end application A, where application A sets its own JSESSIONID cookie for local session management purposes. If Alice logs out of TAM, her TAM session cookie is destroyed but her back end JSESSIONID cookie set by application A is not. Thus, if Alice logs back into TAM at a later time (namely, while application A cookie is still valid), she will resume an existing session with A. This scenario becomes even more alarming when one considers behavior in a "kiosk" style environment where these session cookies are maintained by a browser that is shared by many different people. Now, if Alice logs out from TAM and Bob, who has been waiting to use this Internet kiosk, logs in, Bob inherits Alice's application A JSESSIONID cookie by virtue of the reuse of the browser. This situation is illustrated in the UML sequence diagrams shown in FIG. 1 (for Alice) and FIG. 2 (for Bob, following Alice's log out from application A). In particular, these diagrams show representative message and information flow within this type of operating environment in which the back end application A is accessed (first by Alice, and then by Bob) via a shared browser. Obviously, this scenario is quite dangerous as it has the potential to expose to Bob Alice's resources (such as her bank account).

BRIEF SUMMARY OF THE INVENTION

Generally, the present invention provides a technique that ties back-end application session management to the session management at a point of contact (PoC). After a first user logs off the point of contact, the solution prevents the existing artifacts (e.g., session cookies) associated with this user from being re-used (either by the first user or any other user) to access back end resources associated with such session management information.

In an illustrative embodiment, the inventive method is carried out at a point of contact (e.g., reverse proxy, a web server plug-in, or the like) that serves as an intermediary between a client browser and one or more back-end applications (or application component), wherein each back-end application has the capability to set its own server-side session management data with respect to the point of contact, and where this application managed data is independent of any client-side session management data set by the point of contact and used by the point of contact to manage a user session. The method begins as a given back-end application returns a response to a first request that has been issued from the client browser (the first request having been received at the point of contact and passed to a back end application or component for processing). The point of contact intercepts (or filters) the out-going response, augments server-side session management data associated therewith with a "stamp," and forwards to the client browser the response, together with the server-side session management data as augmented to include the stamp. The stamp provides a way for the point of contact to determine whether the server-side session management data, if received in a subsequent request, is valid for that request. Later, upon receipt at the PoC of a new user request that includes the server-side session management data (and stamp), the PoC uses the stamp to determine whether the new request is associated with a valid back-end session. A "valid" back-end session is one that was triggered at the back-end application by the point of contact in response to a valid authentication exchange with the user and the point of contact, and where this session has not since been terminated at the point of contact layer. If the request is associated with a valid back-end session, the point of contact removes the stamp from the server-side session management data and forwards the new request (and the management data) to the back-end application for handling.

The method ensures that server-side session management data that has been set by a given back end application or component during a first user's session initiated from a browser cannot be reused through the client browser after the first user has logged off or otherwise had the session terminated at the point of contact.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

The present invention may operate in conjunction within the standard client-server paradigm in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system comprising hardware and software, and these entities communicate with one another over a network, such as the Internet, an intranet, an extranet, a private network, or any other communications medium or link. As described below, a data processing system typically include one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 2:
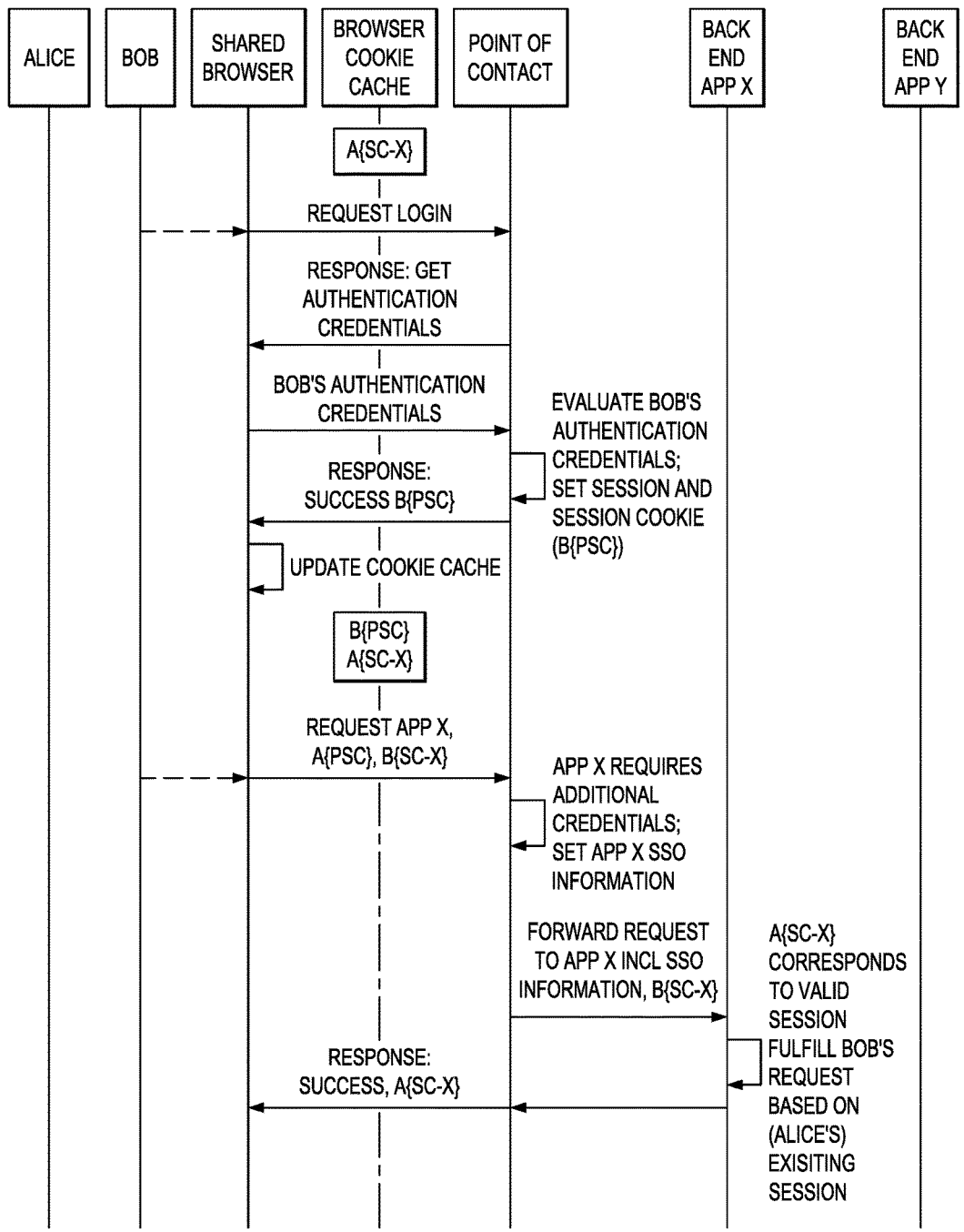
FIG. 2 is a UML sequence diagram illustrating how a second user (Bob) who is accessing the same back-end resource through the Web portal can create a security exposure as a result of the known vulnerabilities of the prior art.

As will be described, the present invention typically is implemented in a system that includes a session management component. Session management typically is provided in association with an access manager, which is a component that prevents unauthorized use of resources, including the prevention of use of a given resource in an unauthorized manner. A representative access manager is the Tivoli® Access Manager product, which is available commercially from IBM, and is represented in FIG. 2. Of course, the identification of this commercial product is not meant to be taken to limit the present invention. More broadly, any system, device, program or process that provides a policy/access/service decision may be used for this purpose.

Figure 3:
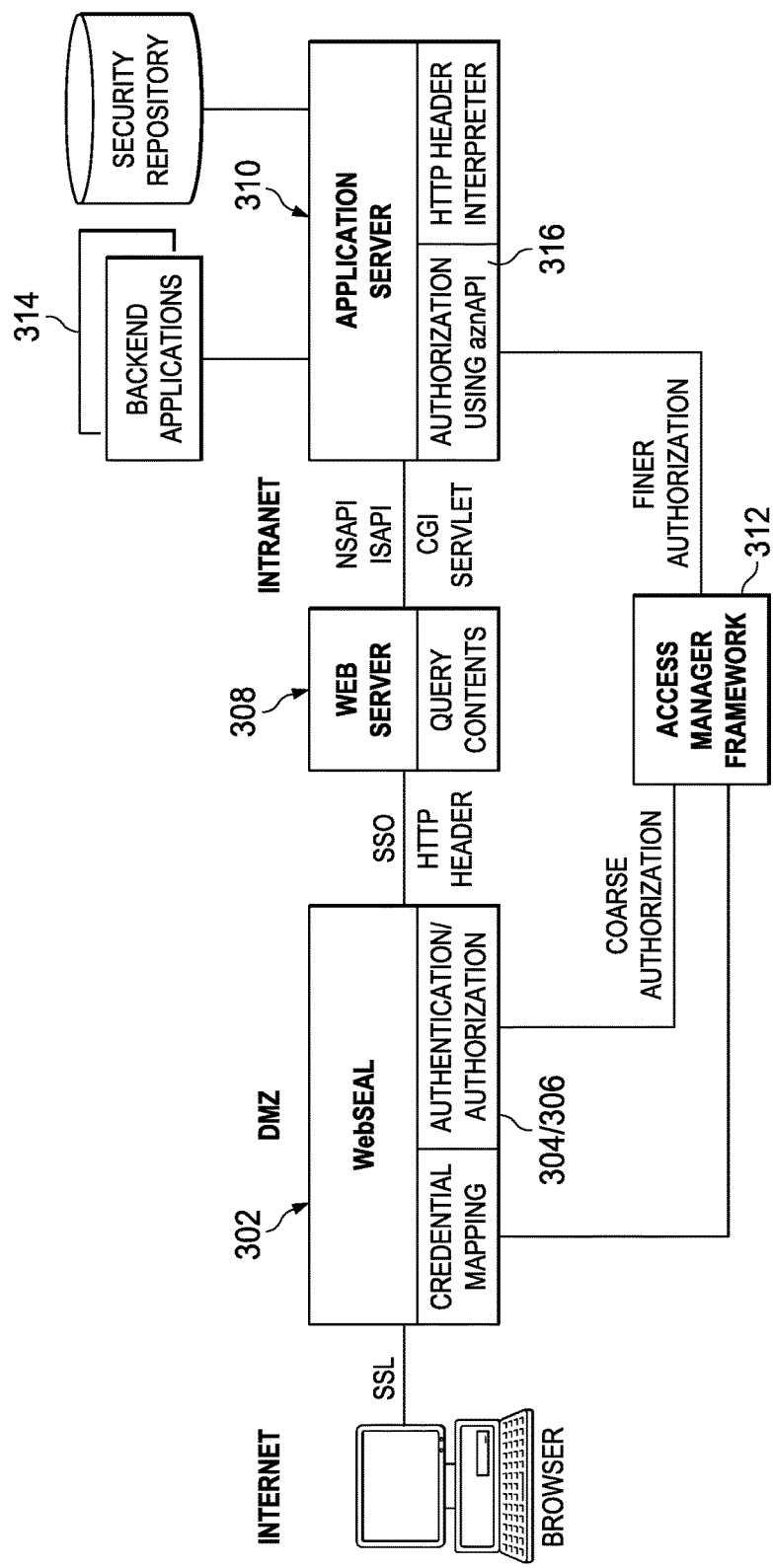
FIG. 3 illustrates a Web portal having an access management framework in which the present invention may be implemented.

FIG. 3 illustrates how TAM is integrated in a Web portal to provide authorization and access control services for Web resources. A high performance, multi-threaded Web server 302 (called WebSEAL in the figure), a TAM component, manages access to all Web servers (such as Web server 308), regardless of their platforms. This allows the enterprise to centrally control their Web resources as a single, logical Web space. When users first enter a portal, they are prompted to provide authentication information that allows the portal to verify the identity of the user. Authentication typically is based around user name and password, although other techniques may be used. An authentication function 304 provides this function. Authorization, in contrast, refers determines what resources an authenticated client can use. For example, a customer may only be able to access e-business applications from the Internet, whereas an employee might also be permitted to access corporate applications. An authorization function 306 provides this function. The Web server component 302 also provides a single sign-on, coarse-grained access control (namely, whether one can access the Web server 308 or not), high availability, and scalability. As shown in FIG. 3, the access manager also enables access control for individual objects on the Web server 308 or application server 310. This may be accomplished by placing a custom common gateway interface (CGI) script on the Web server. This script allows a management console to display and manage the Web space, or application space, of the Web and application servers. Preferably, the access manager framework 312 handles access control for static content and dynamic content. In particular, a utility may be used to place access control lists (ACLs) in components of applications, or in CGIs. By passing user and group information in HTTP headers, the application server 310 can make further access control decisions if required. The information passed from WebSEAL can also be used to access back end applications 314. In addition, for more fine-level authorization control, the access manager implements aznAPI 316, which as noted above allows an application to call out to an authorization service for authorization decisions. In this case, access manager identity information passed to the application server by an HTTP header can be used by aznAPI to make further fine-grained access control decisions, e.g., based on the specific internals of the application (and any authorization decisions enforced by the WebSEAL component 302). Information passed from WebSEAL and obtained from the access manager framework 312 can be used to make access decisions to back end applications.

With the above as general background, the present invention is now illustrated and described.

Figure 4:
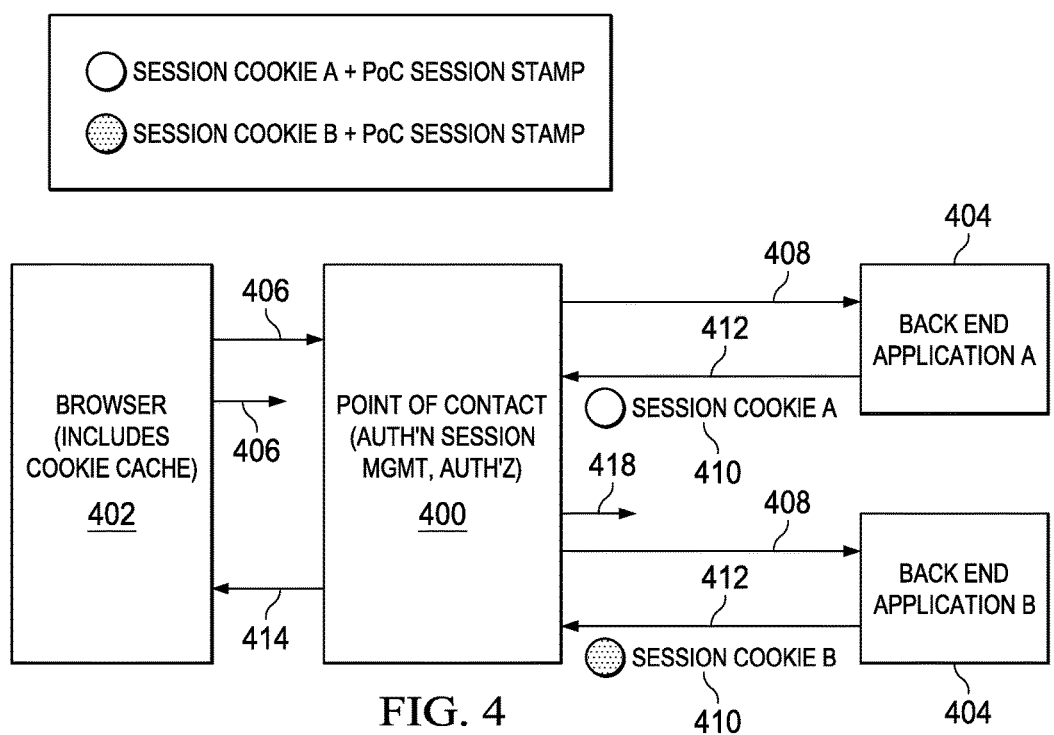
FIG. 4 illustrates a point of contact (PoC) system and how the method of the present invention is implemented.

With reference to FIG. 4 and as noted above, the invention typically is implemented in an environment in which a point of contact (PoC) 400 acts as an intermediary between a client browser 402 and one or more back end applications 404. The point of contact is a reverse proxy, a Web server plug-in, or the like. This component is responsible for the session management of users, as handled with a PoC-managed session cookie (such as cookie A{PSC}), which refers to Alice's Point-of-Contact Session Cookie). More specifically, the point of contact may be implemented by the access manager (or components thereof) shown in FIG. 3. In a typical transaction, the client sends to the server a request 406 for a resource. Assume that the PoC 400 examines the request but finds no PoC-side established session information. In such case, the PoC 400 may attempt to authenticate the user. While the ideal deployment will have the PoC managing all session information for back-end applications (so that this is the only authentication required of the user), many "legacy" applications are moved behind a PoC but are unable to "turn off" their existing authentication and session management. To provide a simplified experience for the user, the PoC may be configured to assert the necessary authentication credentials to the back-end application on behalf of the user. As noted above, the back-end application will use this information as part of its existing processing, including the setting of its own session management functionality.

Figure 1:
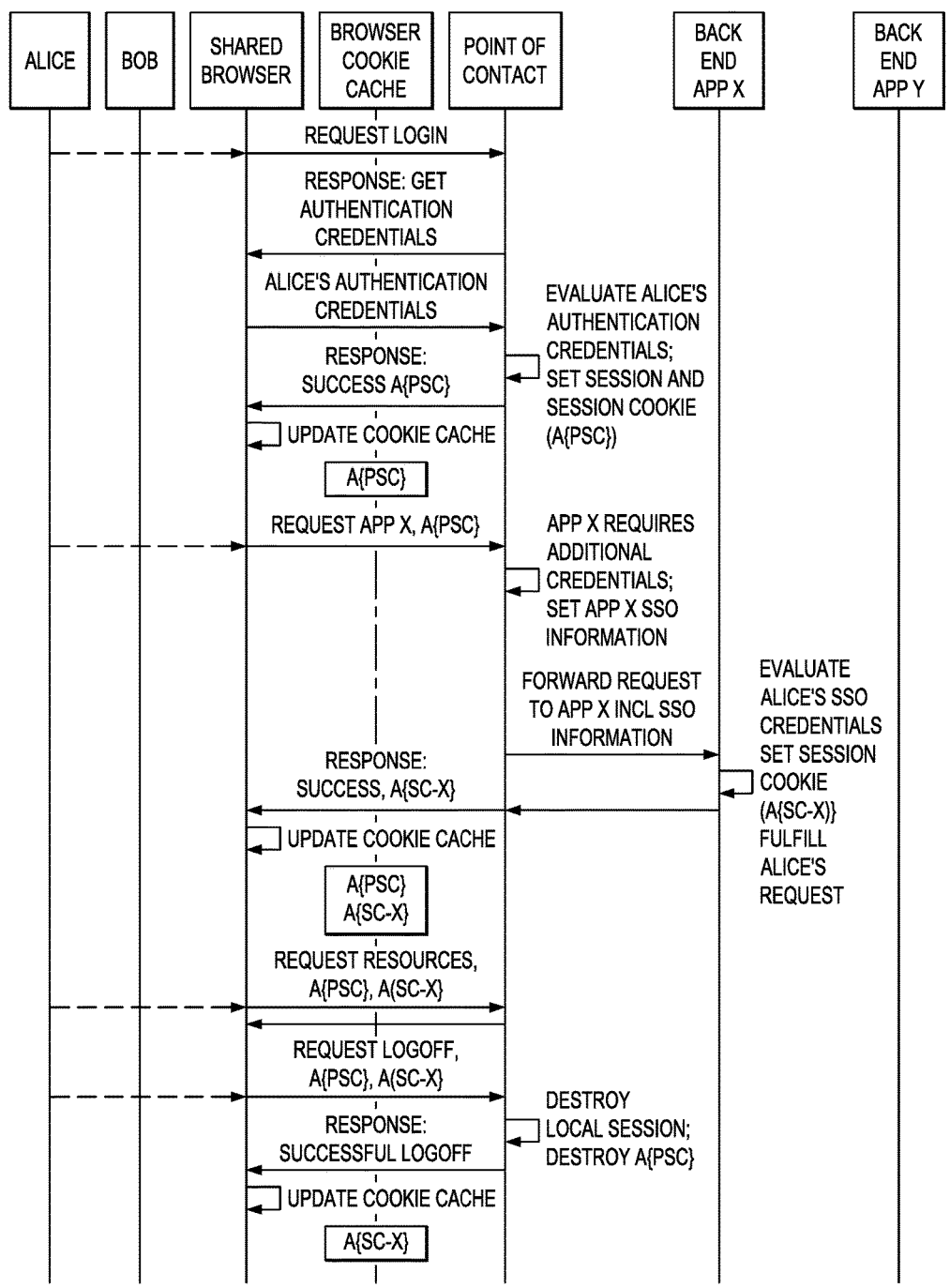
FIG. 1 is a UML sequence diagram illustrating how a first user (Alice) accesses a back-end resource (application X) through a Web portal via a shared client browser.

The PoC passes information to the given back-end application along with the request so that the back-end application can establish its own session information. This operation is represented by arrow 408. Of course, the PoC sends the request to the back-end application 404 to which the original request was directed. The given back end application that receives the request identifies or authenticates the user and sets a server-side (or "server-set") session cookie 410 (such as A {SC-X} in FIG. 1, representing Alice's Session cookie at X) for server-side session management. It should be appreciated that this cookie is independent of any session management data (such as A {PSC} in FIG. 1) associated with the PoC (namely, proxy-side session management information). When the back-end application completes its processing of the request, it generates a response, which is then output as indicated by arrow 412. The server-side session cookie 410 is associated with the response.

According to the present invention, the PoC 400 intercepts the response 412 and places a (user-proxy-server) validity (or "session") stamp on the server-side session cookie 410 and continues with the response, as indicated by arrow 414. Conveniently, the validity stamp is placed within the server-side session cookie, although this is not a requirement. In this way, the validity stamp may be considered to "augment" (or supplement) the server-side session cookie generated by the back-end application. More generally, one of ordinary skill will appreciate that the validity stamp can be deemed to be "associated" with the server-side session cookie, as long as it tightly bound thereto (in the usual case, by modifying the cookie). This is required to make sure that a malicious user cannot remove the (tightly-bound) stamp and thereby reuse the cookie. Upon this association, the server-side session cookie 410 may be said to have been "stamped" by the PoC. The validity stamp enables the PoC to determine whether the server-side session cookie 410, if received in a subsequent request, is valid.

In particular, and as indicated by arrow 416, assume now that the client browser has sent a new request for a resource to the server,(namely, to one of the back-end applications). The new request may include one or more PoC validity-stamped session cookies as has been described. The PoC removes the validity stamp from the appropriate server-set session cookie and forwards the new request to the back-end application, but only if the server-set session cookie is valid for the particular request. This forwarding operation is indicated by the arrow 418.

Figure 5:
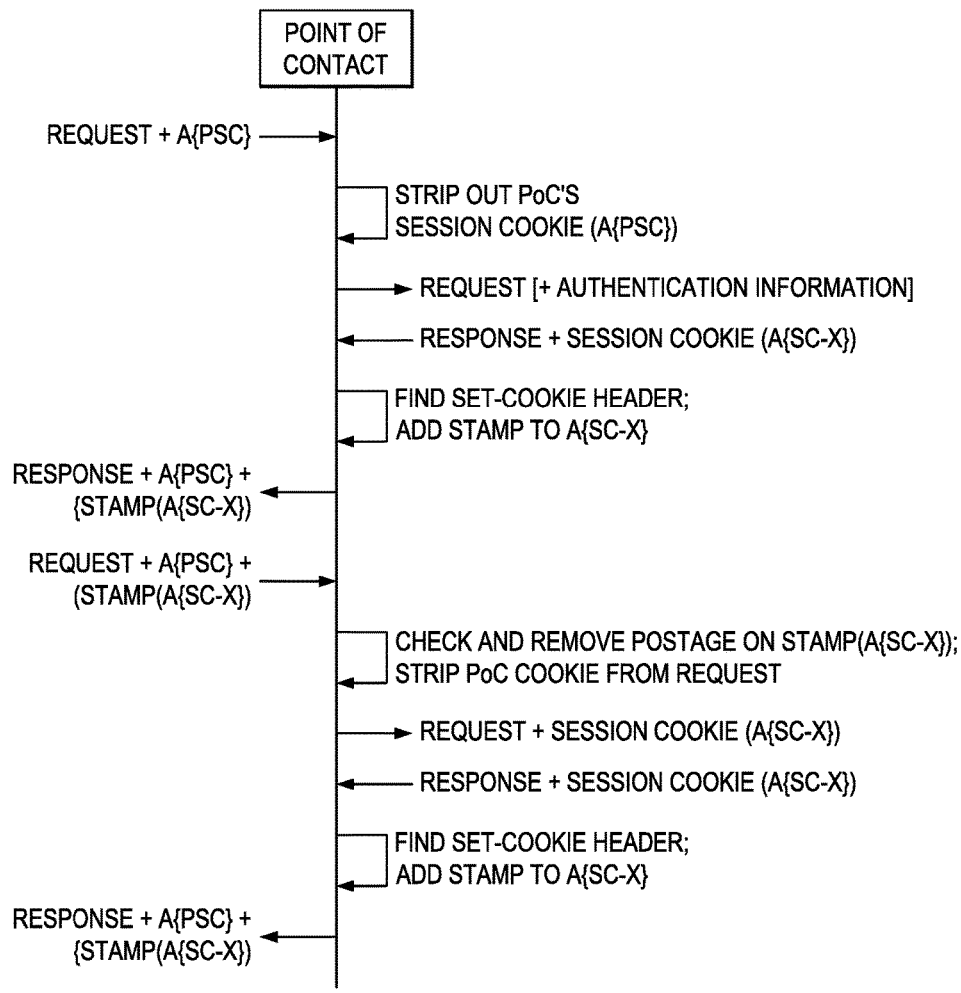
FIG. 5 is a UML sequence diagram illustrating how the inventive method operates within the point of contact.

Thus, according to the invention and as illustrated in FIG. 5, each in-bound request through the PoC is investigated, for example, as part of a URL re-write functionality that is provided by the front-end. The PoC performs a simple check for the validity stamp on any server-set session cookie associated with that request. If the stamp is not present (and the cookie itself is not a PoC-issued cookie), or if the stamp does not validate, then this particular cookie refers to a non-existing session. The cookie is not forwarded to the back-end, and the back-end, when it receives the request together with the SSO credentials for the user, will establish a new session cookie relevant to this user (and to the session being managed by the PoC). If, however, the stamp exists and is valid, the stamp is stripped from the cookie (in the diagram, this is referred to as "remove postage" given the stamp metaphor) and the cookie is included with the request. Thus, in the example described above with respect to FIG. 1, if Alice ends her session with the PoC, any cookies that have been set by back-end application X (and maintained at the client browser) will no longer have a valid session stamp, and these cookies will not be included in any back-end requests forwarded by the point of contact/access manager. They will eventually be expired out of the cache and/or flushed when the browser is eventually closed. Continuing with this example, when Bob accesses the same application as did Alice (e.g., back end application X), no session cookies set by application X will be included in the request, and Bob will not be granted access to Alice's resources.

Each out-bound request is similarly examined. In particular, and as seen in FIG. 5, if a set-cookie header is included with the response, the response is intercepted (filtered) and a session stamp added to the cookie, as described above. This stamp is included in the cookie forwarded to the user's browser. If a set-cookie header is found and the cookie already contains a valid stamp, then the stamping function may be skipped (depending on performance and security tradeoffs) and the cookie forwarded as is; alternatively, the stamp is updated with a new, equally valid stamp. In either case, and as illustrated in FIG. 5, preferably the cookie stamp is only added to a cookie for transit between the point of contact and the user's browser. Preferably, the stamp is not included as part of the forwarding of a request to a back-end application.

Figure 6:
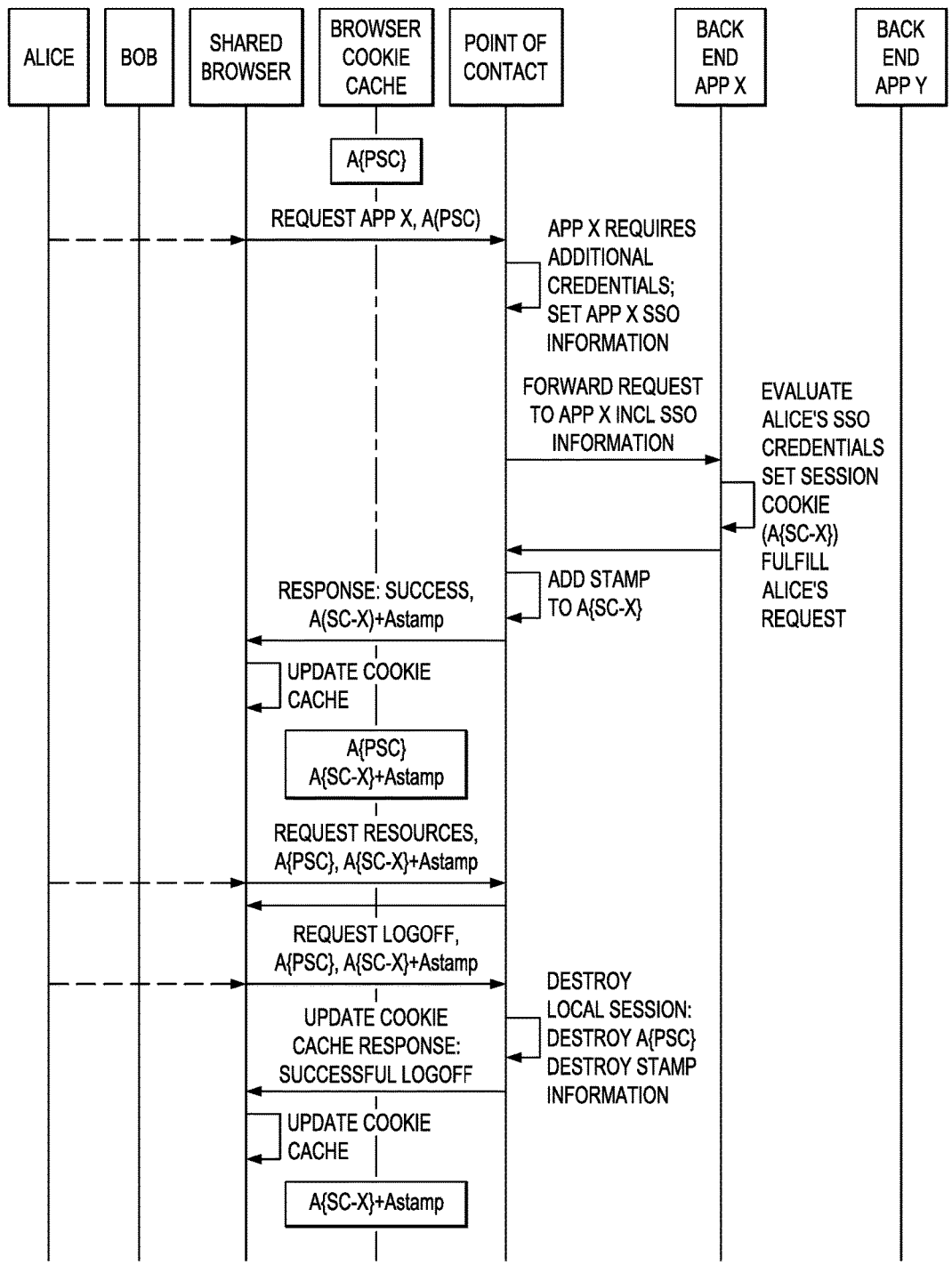
FIG. 6 is a UML sequence diagram illustrating session management for a first user using the inventive cookie stamping technique.
Figure 7:
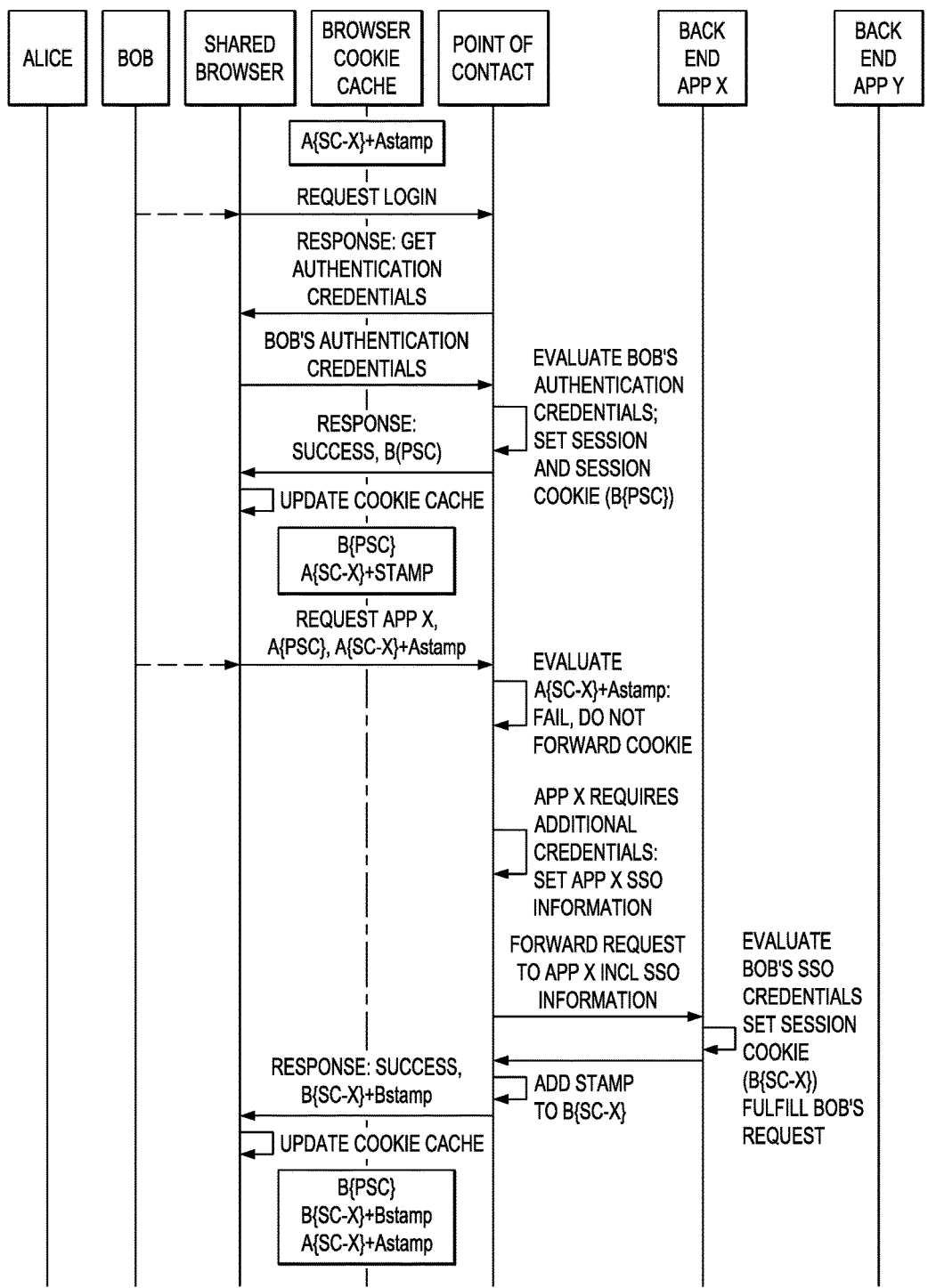
FIG. 7 is a UML sequence diagram illustrating session management for a second user following the log off of the first user identified in FIG. 6.

FIG. 6 and FIG. 7 illustrate how the inventive method overcomes the cookie re-use problem identified in conjunction with FIG. 1 and FIG. 2. In particular, FIG. 6 is similar to the UML sequence flow diagram of FIG. 1 with the inclusion of the validity stamp functionality during Alice's access to back-end application X. FIG. 7 illustrates Bob's subsequent access to the application X using the same browser. As can be seen in FIG. 7 (and in contrast to the outcome in FIG. 2), Bob's interaction with Alice's application X stamped session cookie does not result in the cookie being forwarded to the application X. Thus, when the validity stamp is used the browser is unable to re-use (for Bob) a server-set session cookie that was originally set by a back end application when Alice was connected to the PoC.

The validity stamp can be generated in many different ways. One convenient technique is to take a hash of: (a) the cookie contents and (b) some unique, preferably one-time piece of information maintained (by the PoC) within the user's session (i.e. a value that is not easily guessed or reproduced by an unauthorized person or entity, typically a universally unique identifier (UUID), or a strong pseudo-random number (SPRN) that cannot be guessed or reused). The validity stamp is then the result of stamp=hash (bin64 encode cookie+SPRN). The bin64 encoding is use to serialize the cookie contents into a format that can be run through the hashing algorithm. As noted above, once generated, the stamp is associated with the cookie. In this manner, the encryption is bound to the user and, in particular, the user's session and, thus, the stamp will only correctly validate (resulting in the cookie, in the clear) for the duration of the user's PoC session (as viewed from the proxy-side). In particular, and once again looking at FIG. 1, once the session cookie (e.g., A {PSC}) set by the point of contact server expires because Alice has logged off, or because the session has otherwise been terminated at the PoC), any attempt to decrypt the stamp on associated cookie (A{SC-X}, or others) will fail. That is, the PoC tries to validate the stamp by attempting to recreate it based on the UUID or SPRN that has been associated with the user's session; as the user's session no longer exists, however, there is no way to recreate the UUID or SPRN to in turn re-generate the stamp. For example, if B{PSC} exists, meaning that Bob has now established a valid session with the PoC, any attempt to validate the stamp on A{SC-X} will fail, as the UUID or SPRN associated with Bob's session will not validate properly.

If desired, to enhance security, the stamp also may be signed, via a digital signature. One of ordinary skill, however, will appreciate that, to a certain extent, the stamp does not need to be "secured" (e.g., using encryption or digital signatures), because any changes to the stamp in effect renders the cookie useless so that the information cannot be replayed.

The following are various techniques to create (and then validate) the stamp:

1. $Cookie^{STAMP}$=Cookie+Sign{hash[bin64(cookie)+SPRN]}

To validate, the PoC may rebuild Sign{hash[bin64(cookie)+SPRN]} based on the PoC-stored SPRN and compares the result with the value appended to $Cookie^{STAMP}$ or the PoC may extract {hash[bin64(cookie)+SPRN]} based on its knowledge of the public/private signing key-pair, and compare this to a local calculation based on the received cookie and the PoC-stored SPRN. Additionally, the PoC may chose to validate the signature to ensure that it has been placed by a reliable party (the PoC or an associated party that the PoC trusts to generate a $Cookie^{STAMP}$).

2. $Cookie^{STAMP}$=Cookie+hash[bin64(cookie)+SPRN]

To validate, the PoC rebuilds hash[bin64(cookie)+SPRN] based on the PoC-stored SPRN and compares the result with value appended to $Cookie^{STAMP}$.

3. $Cookie^{STAMP}$=Cookie+SPRN (a) To validate, the PoC compares SPRN in $Cookie^{STAMP}$ with a PoC-stored SPRN (so that changes to SPRN are detected, and because if SPRN=UUID, no reuse is possible).

(b) In the alternative, to validate, the PoC builds Sign{hash[bin64(cookie)+SPRN]} based on $Cookie^{STAMP}$ and compares the result with Sign{hash[bin64(cookie)+SPRN]} stored at PoC.

4. $Cookie^{STAMP}$=Cookie+Encrypt{SPRN}

(a) To validate, the PoC compares decryption of SPRN in $Cookie^{STAMP}$ with PoC-stored SPRN (protects against eavesdropping that could be used to predict SPRN values)

(b) In the alternative, to value, the PoC builds Sign {hash[bin64(cookie)+decrypt(Encrypt{SPRN})]} based on $Cookie^{STAMP}$ and compares the result with Sign {hash[bin64(cookie)+SPRN]} stored at PoC.

As yet another variant, a UUID can be added to the cookie, and then the hash can be stored (at the PoC) with the user's session (as an alternative to storing the UUID with the user's session and including the hash with the cookie). In such case, the validation of the stamp is then recalculated at the PoC and compared with the stored value, but the stored value itself need not be put with the cookie (i.e. on the wire, or in the browser cookie cache).

The present invention provides several advantages. As one of ordinary skill in the art will appreciate, the inventive method provides a simple technique to facilitate "global logoff" in the Web portal-based environment described above. An advantage of this technique is that it ensures that logoff at a point of contact (e.g., an access manager-based reverse proxy or Web server plug-in) does not allow existing artifacts (such as server-side session management data) to be re-used by other parties, for example, to fraudulently access back end resources. The inventive approach is lightweight, meaning that it can easily scale to environments where there are many (millions) of users, each potentially accessing hundreds of back end resources, each with its own session management.

The present invention is not limited to a Web-based portal having a point of contact that provides authentication, session management and authorization, but this will be a typical implementation. The invention may be used in any system, device, portal, site, or the like wherein server-set session management data might be re-used (either by an original user in a different session, or by another user) through the same client browser. More generally, the invention is designed for use in any operating environment wherein given information (including, without limitation, session management data) is not intended to persist across applications or sessions but ends up doing so because of patterns of client re-use and/or application-level granularity of session information.

The invention may be implemented in a distributed environment where there may be multiple replicas of the point of contact that may set a cookie stamp, such that any of these PoC replicas can remove/validate the stamp. In such an environment, a request carrying a valid (set of) cookie(s) may go to a replica (located, for example, within a cluster), and that information should be acceptable or parseable by any of the reverse proxy instances in the replica set.

More generally, the invention can take the form of an entirely hardware embodiment, an entirely software embodiment or an embodiment containing both hardware and software elements. In a preferred embodiment, the invention (comprising the client side functionality, the server side functionality, or both) is implemented in software, which includes but is not limited to firmware, resident software, microcode, and the like. Furthermore, as noted above, the invention can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

One or more of the above-described functions may also be implemented as a service in a hosted manner.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, a "cookie" may be generalized as a "data string" or, more generally, a "data structure."

Having described our invention, what we now claim is as follows.

The invention claimed is:

1. A method, operative at an apparatus, the apparatus comprising a processor, and computer memory holding computer program instructions that when executed by the processor comprise a point of contact that serves as an intermediary between a client browser and one or more back end applications, wherein each back-end application sets its own server-side session management data for the point of contact that is distinct from any client-side session management data set by the point of contact and used by the point of contact to manage a user session, the method comprising:

as a back end application returns a response to a first request that has been issued from the client browser, associating with the server-side session management data a validity stamp that is different from the server-side session management data set by the back end application and is useful to determine validity of the server-side session management data if the server-side session management data and the validity stamp are later received in association with a new request, the validity stamp being generated in part using a value that is one of: a unique identifier, and a pseudorandom number, the value being associated with a user session during which the first request is received, forwarding to the client browser the response together with the server-side session management data and the validity stamp, and saving the value for as long as the user session at the point of contact exists; and upon receipt of the new request that has associated therewith the server-side session management data and the validity stamp, determining (i) whether the validity stamp can be re-generated at least in part because the value is still saved at the point of contact and (ii) whether if re-generated the validity stamp is valid, and, if valid, removing the validity stamp from the server-side session management data and forwarding to the back-end application the new request, together with the server-side session management data.

2. The method as described in claim 1 wherein the server-side session management data is a data string set by a back-end application, and the validity stamp is derived as a given function of the data string.

3. The method as described in claim 2 wherein the given function is a hash of the data string concatenated with the value.

4. The method as described in claim 3 wherein the value is a one-time use value associated with the user session initiated from the client browser.

5. The method as described in claim 3 wherein the step of determining whether the validity stamp is valid evaluates whether the stamp can be re-created from the data string and the value for the user session.

6. The method as described in claim 1 wherein the point of contact is a reverse proxy.

7. The method as described in claim 1 wherein the point of contact is a server plug-in.

8. The method as described in claim 1 wherein the validity stamp is derived as a concatenation of the server-side session management data together with a cryptographic hash of given information, the given information being a serial encoding of the server-side session management data concatenated with the value.

9. A method, operative at an apparatus, the apparatus comprising a processor and computer memory holding computer program instructions that when executed by the processor comprise a point of contact that serves as an intermediary between a client browser and a one or more back end applications, wherein each back-end application sets its own server-side session management data for the point of contact that is distinct from any client-side session management data set by the point of contact and used by the point of contact to manage a user session initiated from the client browser, wherein server-side session management data is reuseable by a second end user through the client browser after a first end user has logged off, the method comprising:

as the first end user interacts with the back end application during the user session, associating a validity stamp with the server-side session management data returned from the point of contact, the validity stamp being different from the server-side session management data set by the back end application and is useful to determine validity of the server-side session management data if the server-side session management data and the validity stamp are later received in association with a request from the second end user, the validity stamp being generated in part using a value that is one of: a unique identifier, and a pseudorandom number, the value being associated with the user session, the value being saved for as long as the user session with the first end user at the point of contact exists; and as the second end user interacts with the back end application after the first end user has logged off, using the validity stamp to determine whether the second user obtains access to the first end user's resources at the back-end application by (i) determining whether the validity stamp can be re-generated at least in part because the value is still saved at the point of contact and (ii) determining whether the validity stamp, if re-regenerated, is valid.

10. Apparatus, comprising:

a manager component that serves as an intermediary between a client browser and one or more back end applications, wherein each back end application has the capability to set its own server-side session management data; and a computer readable medium having program code executed by a processor to perform the following method steps:

as a back end application returns a response to a first request that has been issued from the client browser, associating with the server-side session management data a validity stamp that is different from the server-side session management data set by the back end application and is useful to determine validity of the server-side session management data if the server-side session management data and the validity stamp are later received in association with a new request, the validity stamp being generated in part using a value that is one of: a unique identifier, and a pseudorandom number, the value being associated with a user session during which the first request is received, forwarding to the client browser the response together with the server-side session management data and the validity stamp, and saving the value for as long as the user session at the point of contact exists; and upon receipt of the new request that has associated therewith the server-side session management data and the validity stamp, determining (i) whether the validity stamp can be re-generated at least in part because the value is still saved at the point of contact and (ii) whether if re-generated the validity stamp is valid and, if valid, removing the validity stamp from the server-side session management data and forwarding to the back-end application the new request, together with the server-side session management data.

11. The apparatus as described in claim 10 wherein the server-side session management data is a session cookie set by a back-end application, and the validity stamp is derived as a given function of the session cookie.

12. The apparatus as described in claim 11 wherein the given function is a hash of the session cookie concatenated with the value.

13. The apparatus as described in claim 12 wherein the value is a one-time use value associated with the user session initiated from the client browser.

14. The apparatus as described in claim 12 wherein the step of determining whether the validity stamp is valid evaluates whether the stamp can be re-created from the session cookie and the value for the user session.

15. The apparatus as described in claim 10 wherein the manager component performs an authentication function.

16. The apparatus as described in claim 10 wherein the manager component performs an authorization function.

17. The apparatus as described in claim 10 wherein the program code executes in a reverse proxy.

18. The apparatus as described in claim 10 wherein the program code executes in a server plug-in.

19. A method, operative at an apparatus, the apparatus comprising a processor and computer memory holding computer program instructions that when executed by the processor comprise a point of contact that serves as an intermediary between a client browser and one or more back-end applications, comprising:

as a back end application returns a response to a first request that has been issued from the client browser, stamping a session cookie set by the back end application and forwarding to the client browser the response together with the stamped session cookie, wherein the stamped session cookie is different from the session cookie set by the back end application, the stamped session cookie being generated in part using a value that is one of: a unique identifier, and a pseudorandom number, the value being associated with a user session during which the first request is received;

saving the value for as long as the user session at the point of contact exists; and upon receipt of a new request that has associated therewith the stamped session cookie, forwarding to the back end application the new request together with the session cookie if (i) the stamped session cookie can be re-generated at least in part because the value is still saved at the point of contact and (ii) if re-generated, the stamped session cookie is determined to be valid.

20. The method as described in claim 19 wherein the stamped session cookie is determined to be valid if, upon receipt of the new request, the stamped session cookie can be generated from a hash of the session cookie and the value associated with the user session.

21. A non-transitory computer-readable medium having computer-executable instructions that, when executed by a processor of a data processing system, perform a method within a point of contact that serves as an intermediary between a client browser and a one or more back end applications, wherein each back-end application sets its own server-side session management data for the point of contact that is distinct from any client-side session management data set by the point of contact and used by the point of contact to manage a user session initiated from the client browser, wherein server-side session management data is reuseable by a second end user through the client browser after a first end user has logged off, the method comprising:

as the first end user interacts with the back end application during the user session, associating a validity stamp with the server-side session management data returned from the point of contact, the validity stamp being different from the server-side session management data set by the back end application and is useful to determine validity of the server-side session management data if the server-side session management data and the validity stamp are later received in association with a request from the second end user, the validity stamp being generated in part using a value that is one of: a unique identifier, and a pseudorandom number, the value being associated with the user session, the value being saved for as long as the user session with the first end user at the point of contact exists; and as the second end user interacts with the back end application after the first end user has logged off, using the validity stamp to determine whether the second user obtains access to the first end user's resources at the back-end application by (i) determining whether the validity stamp can be re-generated at least in part because the value is still saved at the point of contact and (ii) determining whether the validity stamp, if re-regenerated, is valid.

22. A non-transitory computer-readable medium having computer-executable instructions that, when executed by a processor of a data processing system, perform a method within a point of contact that serves as an intermediary between a client browser and a one or more back end applications, the method comprising:

as a back end application returns a response to a first request that has been issued from the client browser, stamping a session cookie set by the back end application and forwarding to the client browser the response together with the stamped session cookie, wherein the stamped session cookie is different from the session cookie set by the back end application, the stamped session cookie being generated in part using a value that is one of: a unique identifier, and a pseudorandom number, the value being associated with a user session during which the first request is received;

saving the value for as long as the user session at the point of contact exists; and upon receipt of a new request that has associated therewith the stamped session cookie, forwarding to the back end application the new request together with the session cookie if (i) the stamped session cookie can be re-generated at least in part because the value is still saved at the point of contact and (ii) if re-generated, the stamped session cookie is determined to be valid.

* * * * *